US012540503B2

(12) United States Patent
Schlögl

(10) Patent No.: US 12,540,503 B2
(45) Date of Patent: Feb. 3, 2026

(54) FACADE ELEMENT AND METHOD FOR PRODUCING A FACADE

(71) Applicant: Sedak GmbH & Co. KG, Gersthofen (DE)

(72) Inventor: Fritz Schlögl, Stadtbergen (DE)

(73) Assignee: Sedak GmbH & Co. KG, Gersthofen (DE)

( * ) Notice: Subject to any disclaimer, the term of this patent is extended or adjusted under 35 U.S.C. 154(b) by 1196 days.

(21) Appl. No.: 17/290,429

(22) PCT Filed: Oct. 22, 2019

(86) PCT No.: PCT/EP2019/078717
§ 371 (c)(1),
(2) Date: Apr. 30, 2021

(87) PCT Pub. No.: WO2020/088989
PCT Pub. Date: May 7, 2020

(65) Prior Publication Data

US 2022/0034151 A1 Feb. 3, 2022

(30) Foreign Application Priority Data

Oct. 31, 2018 (DE) ......................... 102018127210.3
Oct. 31, 2018 (DE) ......................... 202018106224.7

(51) Int. Cl.
*E06B 3/66* (2006.01)
*E06B 3/663* (2006.01)

(52) U.S. Cl.
CPC ........ *E06B 3/6621* (2013.01); *E06B 3/66328* (2013.01); *E06B 3/66333* (2013.01); *E06B 3/66342* (2013.01); *E06B 2003/66338* (2013.01)

(58) Field of Classification Search
CPC ............... E06B 3/6621; E06B 3/66328; E06B 3/66333; E06B 3/66342; E06B 3/6202; E06B 3/56; E06B 2003/66338
See application file for complete search history.

(56) References Cited

U.S. PATENT DOCUMENTS

2017/0362882 A1* 12/2017 Boucher ............. E06B 3/66352

FOREIGN PATENT DOCUMENTS

| | | | |
|---|---|---|---|
| DE | 4343964 | A1 | 6/1995 |
| DE | 10207351 | C1 | 7/2003 |
| DE | 102006002676 | A1 | 8/2007 |
| EP | 3367027 | A1 | 8/2018 |
| WO | 9937129 | A2 | 7/1999 |
| WO | 2016091954 | A1 | 6/2016 |
| WO | 2018028885 | A1 | 2/2018 |

* cited by examiner

*Primary Examiner* — Laura A Auer
(74) *Attorney, Agent, or Firm* — Boardman & Clark LLP

(57) ABSTRACT

Disclosed is a facade element having a first glass unit, in particular insulating glass unit, and at least one second glass unit, in particular insulating glass unit, arranged adjacently thereto, wherein the two glass units are connected to one another via their edges adjoining one another in an abutment region, preferably exclusively with the aid of an, in particular transparent, adhesive connection, wherein the adhesive connection is preferably formed by a two-component silicone material. The invention further relates to a corresponding production method.

14 Claims, 2 Drawing Sheets

100

FACADE ELEMENT AND METHOD FOR PRODUCING A FACADE

CROSS-REFERENCE TO RELATED APPLICATIONS

Figure 1:
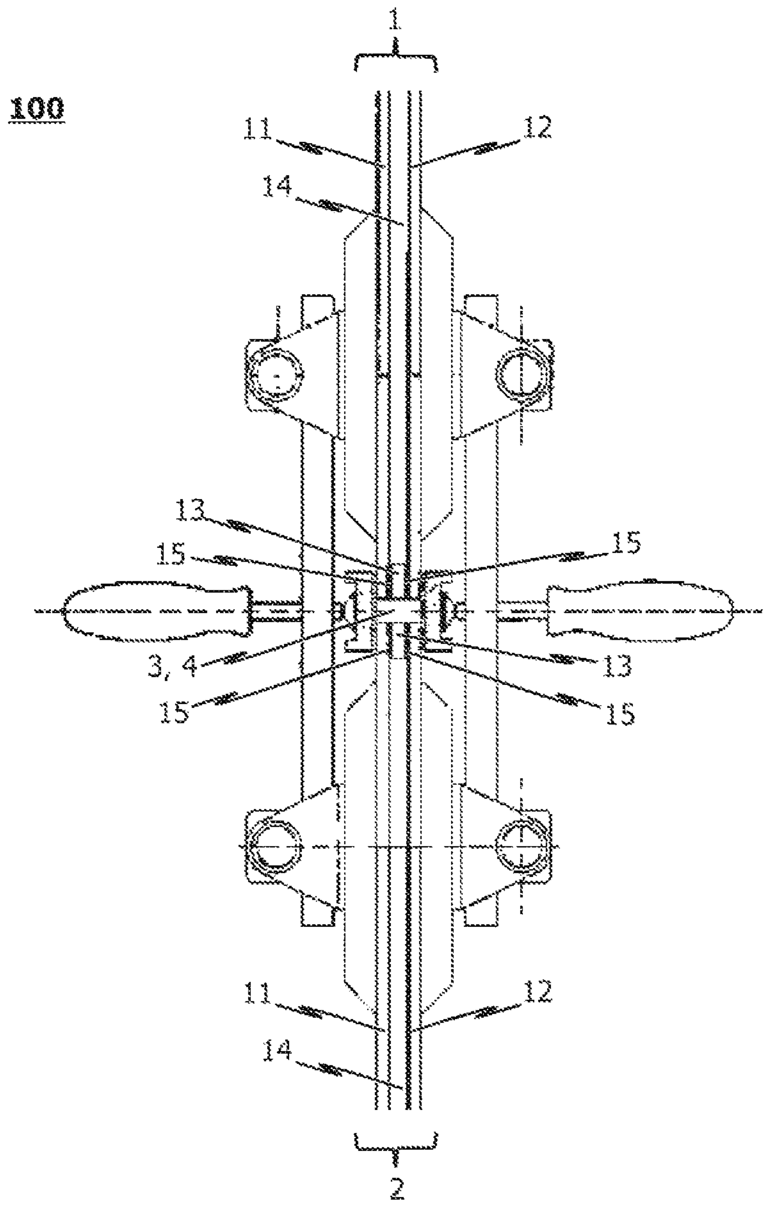

This application is a national phase filing of International Patent Application No. PCT/EP2019/078717, entitled "FAÇADE ELEMENT AND METHOD FOR PRODUCING A FAÇADE ELEMENT," which has an international filing date of Oct. 22, 2019, which claims priority to German Patent Application No. 102018127210.3 filed Oct. 31, 2018, and claims priority to German Patent Application No. 202018106224.7 filed October 31, 2018, the entire contents of each of which is hereby incorporated herein by reference for all purposes.

The present invention relates to a facade element having a first glass unit, in particular an insulating glass unit, and an adjacently arranged second glass unit, in particular an insulating glass unit.

An insulating glass unit, which is sometimes also called a multiple glazing unit, is useful for increasing thermal insulation and acoustic insulation in building interiors and therefore serves to increase the comfort of the building's occupants compared to the scant insulation provided by common single glazing units. Simple double glazing units are formed by two surface elements, in particular glass pane-like material, the ends of which are usually held and secured at a distance from one another by means of a spacer. The spacer is usually a metal section which is glued to the panes along the length of their four edges.

A hermetically sealed cavity is formed between the panes and delimited by the spacer. This cavity is filled with a dry gas such as dry air. It is important for the gas confined within the space between the panes to be kept in a dry state in order to avoid any water condensation inside the double glazing during temperature changes. Water vapor condensation on the inner faces of the panes impairs the transparency of the glazing.

Further known with respect to multiple glazing units is providing for a rim made of resin which extends at least between the spacer and each of the surface elements in order to hold the surface elements in place. The unit is usually mounted in a frame of U-shaped cross-sectional profile which holds the edges of the surface elements. Said frame is then secured to a support structure, for example in the opening of a building's wall.

In the field of building facades, increasing emphasis is being placed on the aesthetics of the integrated elements and the overall aesthetics of the building. Particularly in the case of large corporate building complexes or that of stores, there is a demand for large-scale glass facades. Large-scale glass facades thereby usually consist of a plurality of insulating glass unit elements.

In order to meet the requirements relative to building insulation and thus also keep heating and air conditioning system costs within limits, the insulating glass units consist of multiple glass panes. For better thermal insulation, the space between the panes; i.e. the interior space between the surface elements, can be filled with a gas of low thermal conductivity.

To create the interior space, spacers are used to connect the surface elements to each other in gas-tight manner, in particular also by employing a combination of various spacers and sealants. The sealing between the spacers and the glass panes, and in particular the sealing of the abutment region between two spacers, is thereby of central importance in creating the gas-tight interior space.

However, due to the size of the surface elements in large-scale glass facades, a lasting and reliable seal between the spacers and the glass panes, and in particular the sealing of the abutment region between two spacers, is problematic. This is due in no small part to the relatively large forces acting on the seal and the spacer in large-scale multiple glazing units.

The invention is based on the task of specifying a facade element, in particular a building facade element, which is suited for use in a large-scale glass facade and with which the known problems of sealing the space between the panes no longer arises.

Moreover to be specified is a corresponding method for producing such a facade element.

With respect to the facade element, the task on which the invention is based is solved by the subject matter of independent claim 1 and, with respect to the inventive method, by the subject matter of accompanying independent claim 9, wherein advantageous developments of the inventive facade element, or inventive method respectively, are specified in the corresponding subclaims.

Accordingly, the invention relates in particular to a facade element having a first glass unit, in particular an insulating glass unit, and an adjacently arranged second glass unit, in particular an insulating glass unit, whereby the two glass units are connected together by their edges which adjoin each other in an abutment region, preferably solely by means of an adhesive connection, wherein the adhesive connection is in particular formed by a preferably transparent two-component silicone material.

Because the glass units are glued to one another in their abutment area via a silicone material pursuant to the invention, corresponding profile arrangements, in particular U-shaped profile arrangements, for connecting the two adjacent glass units to each other can be dispensed with. The abutment region can thereby have a significantly less conspicuous design.

Yet the invention offers even further surprising advantages. Because the adhesive connection is in particular formed by a two-component silicone material, it is possible to contain the abutment region for connecting the two glass units and thus define a joint area into which the silicone material can then be introduced in liquid form, in particular poured or injected.

The introducing of the silicone material in liquid form has the decisive advantage of the adhesive connection being formed without bubbles. This in turn enables using a two-component silicone material for the silicone material which is of crystal-clear transparency, particularly after curing.

With this embodiment, the actual abutment region; i.e. the joint area between the two adjoining and adjacent glass units, is preferably rendered completely transparent such that the joint area, which is usually opaque in the prior art, is then no longer visually apparent.

In other words, the inventive solution enables forming a large-scale facade element which conveys a monolithic and in particular completely transparent impression, but yet which consists of multiple insulating glass unit elements, whereby no problems can ensue from the sealing of the space between the panes of the individual insulating glass units due to their relatively small size. Using transparent spacers and a transparent, preferably two-component, silicone material as an adhesive connection prevents unwanted visual detractions in the transition area of the elements such that the facade element—although composed of multiple individual insulating glass units—still does not detract from the overall visual appearance.

The individual insulating glass units can preferably be individually removed from or replaced in the facade element, which becomes necessary for example when an insulating glass unit of the facade element suffers damage.

The inventive solution is particularly advantageous in conjunction with glass units which are each designed as insulating glass units and have at least one first transparent surface element, preferably in the form of a glass pane, and at least one second transparent surface element, likewise preferably in the form of a glass pane, wherein the two surface elements of each glass unit designed as an insulating glass unit, including the space between the panes, are connected together by a preferably circumferential spacer. The spacer of the first and/or second insulating glass unit is thereby advantageously formed from a transparent material, in particular a glass material or a suitable plastic material.

In this way, the transition area between the two adjacent glass units becomes virtually invisible. In other words, the surface element, which is composed of a plurality of glass units, in particular insulating glass units, creates the visual impression of a monolithic surface element; i.e. a surface element with no abutment regions between individual adjacent insulating glass units.

It is thereby advantageous for the spacer of the first and/or second insulating glass unit to be composed of a transparent material and particularly be of multi-part design so as to be able to realize an overall circumferential spacer as simply as possible. It is further advantageous for a, likewise preferably transparent, sealant to be provided between the spacer of the first and/or second insulating glass unit and the first and second surface element of the respective insulating glass unit.

The inventive solution thus enables relatively large-scale facade elements to be provided which, as a whole, optically define a maximum transparent area, in particular without distracting visually opaque abutment regions, even though the surface element consists of a plurality of individual insulating glass units or glass units respectively. The common problems that occur with large-scale facade elements such as, for example, thermally induced bending (bimetal effect), the barometric effect, internal condensation within an air gap, etc., these problems being typical for large-scale surface elements, no longer arise with the facade element according to the invention.

With respect to the method according to the invention, provided in particular is for the at least two glass units forming the facade element to be arranged relative to one another such that the edges of the two glass units adjoin each other in an abutment region. The abutment region is then limited in order to thus define a joint area to be filled with the silicone material. The silicone material is then introduced into the defined joint area in liquid form.

Particularly conceivable in this context is pouring the silicone material into the defined joint area or using an injector to inject or respectively introduce it into the defined joint area.

As previously indicated, the silicone material is preferably a two-component material which, when introduced into the defined joint area, has a viscosity of between 0.1 Pa-s and 10 Pa-s, and preferably of between 1.0 Pa-s and 3.5 Pa-s (measured in each case at room temperature; i.e. 21° C.).

Various approaches are conceivable for delimiting the abutment region so as to define the joint area. For example, it is possible to fit and temporarily fix a prefabricated mold or mask on at least one of the two glass units to delimit the abutment region. Alternatively thereto, however, it is also conceivable to delimit the abutment region using a simple adhesive tape.

As an alternative thereto, the abutment region can be delimited with the aid of a molding so as to define a joint area closed to the outside.

The following will reference the accompanying drawings in describing the invention in greater detail.

Figure 2:
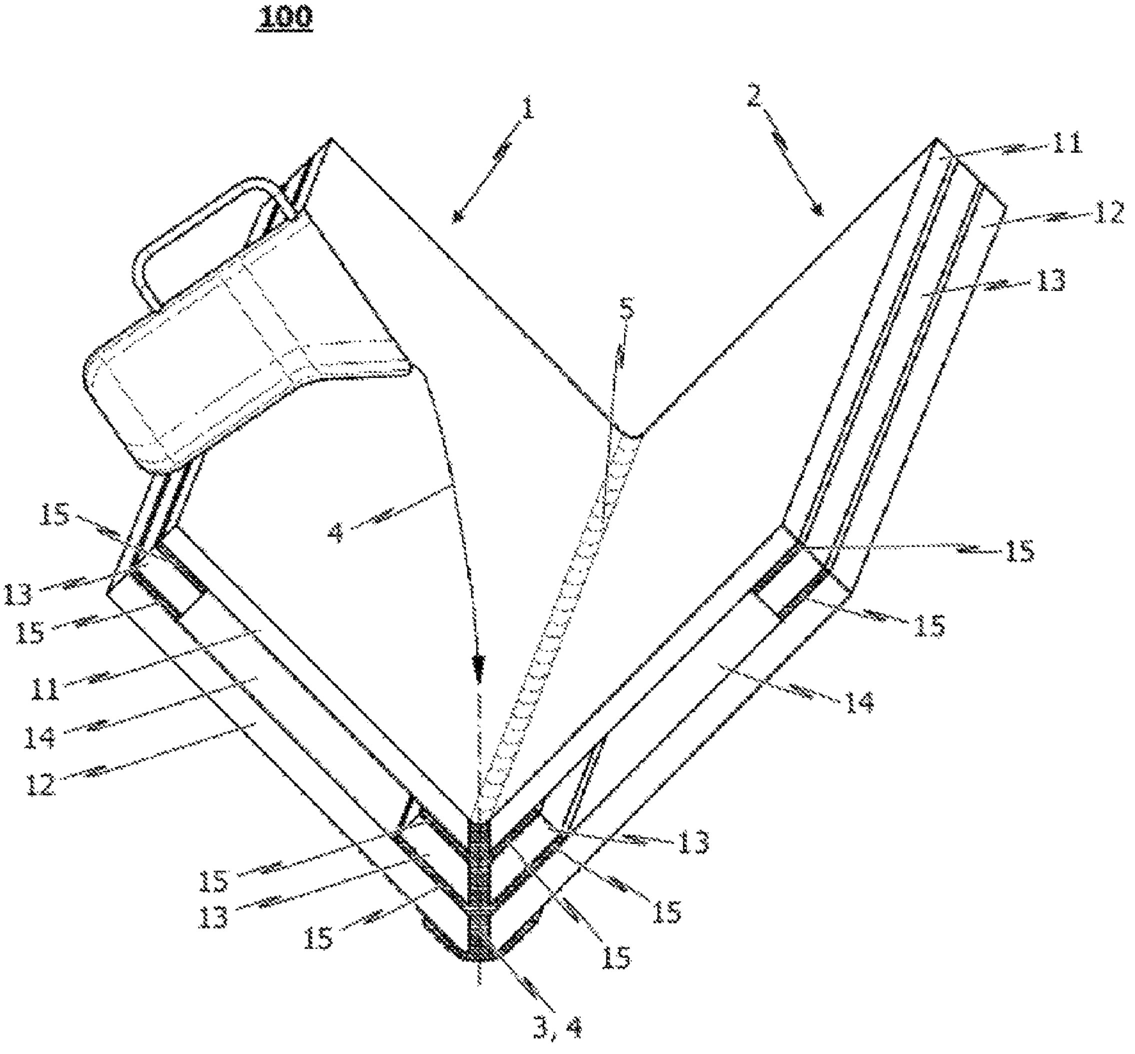

Shown are:

FIG. 1 a schematic partially sectioned view of the joint area between two glass units during the introduction of a silicone material; and FIG. 2 a schematic isometric view of the abutment region between two adjacent glass units during the introduction of a silicone material into the defined abutment region.

At present, silicone jointings and silicone sealings are only applied to facade glass once it has been fully installed. Since this process requires the silicone material to be in a paste-like state, no pourable type of silicone has yet to date been provided for such an application in construction.

Standard construction site processing makes it impossible to reliably introduce paste-like material into glass joints having joint depths greater than 10 to 15 mm without bubbles. This circumstance therefore additionally requires a corresponding procedure to conceal these bubbles or small voids respectively. Meaning that, the subsequently visible glass edges are for this reason usually printed beforehand or already need to be pre-coated (primed) in bubble-free manner with a thin layer of silicone in the factory.

Yet it follows from such a procedure that a transparent pasty material would still leave unsightly visible bubbles. To date, the only way to conceal these bubbles has been through the use of solid-colored material.

Using solid-colored silicone as jointing or sealing material has also been entirely adequate to date since the use of the standard edge seal alone rendered solid object visibility through the edges of the insulating glass impossible.

However, in order to specify a facade element 100 having the largest possible transparent and optically clear area, one no longer needs to rely on the conventional approach and the use of solid-colored silicone material. According to the embodiments depicted by way of example in the drawings, a respective facade element 100 is in particular provided which, despite the provision of multiple adjacently arranged insulating glass units 1, 2, provides a maximum possible transparent area.

To that end, the insulating glass units 1, 2, which are connected to one another in an abutment region to form the inventive facade element 100, are specially constructed. In detail, the insulating glass units 1, 2 each have at least one first transparent surface element 11, preferably in the form of a glass pane, and at least one second transparent surface element 12, likewise preferably in the form of a glass pane. The two surface elements 11, 12, including a space 14 between the panes, are connected together by a preferably circumferential spacer 13.

In the exemplary embodiments depicted in the drawings, it is thereby in particular provided for each spacer 13 of the first and second insulating glass units 1, 2 to be formed from a transparent material, in particular a glass material or a suitable plastic material.

Furthermore, it is advantageously provided for a preferably transparent sealant 15 to be provided between the spacer 13 and the first and second surface elements 11, 12 of the respective insulating glass unit 1, 2.

In other words, insulating glass units 1, 2 are used which have edge regions formed from a crystal-clear material or crystal-clear materials such that neither does the edge region effect any visual impairment in terms of transparency.

In order to be able to connect the thusly entirely transparent insulating glass units 1, 2 together, the glass units 1, 2 are arranged relative to one another such that the edges of the two glass units 1, 2 adjoin each other in an abutment region. The glass units 1, 2 are preferably temporarily fixed in this position and the abutment region then delimited in order to define a joint area 5.

A silicone material 4, in particular a crystal-clear silicone material 4, is thereafter introduced, in particular poured, into the defined joint area 5 in liquid form, or—as indicated in FIG. 1—injected into the defined joint area 5 via injection.

Because the silicone material 4 is introduced into the defined joint area 5 in liquid form, a reliable, lasting, transparent and bubble-free connection is possible between the two adjacently adjoining glass units 1, 2, even in the case of a complex glass structure such as e.g. insulating glass units 1, 2 with glass spacers 13 which are to be connected together over a corner (see FIG. 2).

Introducing the silicone material 4 in liquid form enables a clean flow to the joint surfaces and any potentially introduced bubbles to rise to the surface. Since this pourable material is to then fully cure without shrinkage, using a two-component material is necessary to that end.

An example of a silicone material 4 suitable for transparent sealing is the two-component crystal-clear pourable silicone offered by the Dow Corning company under the name of "Sylgard 184." A comparable product would for example also be the Elastosil Solar 2202 AB product from the Wacker company.

Advantageously, the silicone materials 4 should have a viscosity of approximately 1 Pa-s to approximately 3.5 Pa-s in order to enable the silicone material 4 to completely fill the defined joint area 5.

Various approaches can be used to delimit the abutment region and define the joint area 5 to be filled with the liquid silicone material 4. One possible variant would be positioning a prefabricated e.g. milled or drawn mold, whereby same is sealed and secured to the glass from the outside, for example by gluing. A pre-defined joint profile, such as for example a defined radius or a precise surface area, can thereby also be created for visual enhancement. This joint profile can consist of Teflon. A different material which has been provided with a separating agent in order to prevent silicone material 4 adherence is also alternatively conceivable.

A simpler method of producing containment for the joint to be poured would be, for example, only enclosing the mold using a self-adhesive tape glued to the glass edges. Said adhesive tape can have a local adhesion-preventing strip along the joint.

In order to protect the glass edges of the filling side from unwanted wetting, the edge area of the filling point is advantageously covered with an adhesive tape. The material ready to be poured is thereafter introduced slowly and evenly into the area to be filled.

The aim is thereby a flow rate of approximately 10 ml/s to approximately 40 ml/s, depending on the joint thickness and the viscosity of the silicone material 4. The removal of excess material and the leveling of the jointing area needs to be completed prior to the start of the curing process so as to enable flow into a perfectly flat surface.

This "open" filling procedure for e.g. the pre-assemblage of a glass corner formation should be undertaken in a clean room under controlled conditions in order to prevent the inclusion of dust or other contaminant particles (see FIG. 2).

An improved filling method thereto would be to close in the entire joint on both sides using a molding or a limiting tape. This joint space could then be filled with the pre-mixed silicone sealing material via injection. This method enables optimizing the horizontal filling of the jointing, as is otherwise only mandatory in the open procedure, up to a potentially vertically aligned filling of the joint in the fully glazed building. The cited injection process additionally requires a somewhat more complex preparation including the secure sealing and the use of mixing or dosing devices.

The present invention enables producing a crystal-clear connection of fully transparent multi-layer and insulating glass along the entire facade, the entirety of which no longer exhibits any disruptive visible joints.

In addition, a use-suited transparent connection of corner glazing can be produced for the first time. Because the decisive advantage of this corner connection is thereby the lasting elasticity of the connection point. In the end, the fully cured connecting material has a Shore A degree of hardness of approximately 35 to 65 as determined according to DIN ISO 7619-1, which corresponds to a converted pressure modulus of elasticity of 3.5 to 8 MPa.

This corner glass connection elasticity enables accommodation of substructure installation tolerances when mounting the prefabricated all-glass corner to the building. An additional advantage of this lasting flexible corner connection is the feasibility of being able to sustainably absorb substructure deformations caused by wind loads or building settlement.

LIST OF REFERENCE NUMERALS

- 1 first glass unit
- 2 second glass unit
- 3 adhesive connection
- 4 silicone material
- 5 joint area
- 1 first surface element
- 12 second surface element
- 13 spacer
- 14 space between panes
- 15 sealant
- 100 facade element

The invention claimed is:

1. A large-scale transparent facade element comprising a plurality of insulating glass units which are connected together by means of a transparent adhesive connection so as to form the large-scale transparent facade element, wherein the plurality of insulating glass units includes a first insulating glass unit adjacently arranged to a second insulating glass unit, whereby the first insulating glass unit and the second insulating glass unit are coupled together by their edges which adjoin each other in an abutment region by the means of the transparent adhesive connection, wherein the transparent adhesive connection is formed by a two-component silicone material introduced in liquid form into a joint area defined in the abutment region of the adjoining edges, is of crystal-clear transparency, and is to be cured without any gas bubbles, wherein the two-component silicone material, when introduced, has a viscosity of between 0.1 Pa-s and 10 Pa-s at 21° C. and a flow rate of approximately 10 ml/s to approximately 40 ml/s.

2. The facade element according to claim 1, wherein the first and second insulating glass unit each comprise at least one first transparent surface element and at least one second transparent surface element wherein the two transparent surface elements of both insulating glass units are connected together by a circumferential spacer.

3. The facade element according to claim 2, wherein the spacer of the first and/or second insulating glass unit is formed from a transparent material, in particular a glass material or a plastic material.

4. The facade element according to claim 2, wherein the spacer of the first and/or second insulating glass unit is of multi-part design.

5. The facade element according to claim 2, wherein a transparent sealant is provided between the spacer of the first and/or second insulating glass unit and the first and second surface element of the respective insulating glass unit.

6. The facade element according to claim 1, wherein the individual insulating glass units are of replaceable design.

7. A method for producing a facade element according to claim 1, wherein the method comprises the following method steps:

providing a first and at least one further second insulating glass unit;

arranging the two insulating glass units relative to one another such that the edges of the two insulating glass units adjoin each other in an abutment region;

delimiting the abutment region and defining a corresponding joint area; and introducing a silicone material into the defined joint area in liquid form, wherein the silicone material is poured into the defined joint area or injected or respectively introduced into the defined joint area by means of an injection process, and wherein the silicone material is a two-component material which is free of any gas bubbles and of crystal-clear transparency after curing.

8. The method according to claim 7, wherein during the method step of introducing the silicone material, the silicone material has a viscosity of between 0.1 Pa-s and 10 Pa-s.

9. The method according to claim 7, wherein a prefabricated mold is fit and temporarily fixed on at least one of the two insulating glass units in order to delimit the abutment region.

10. The method according to claim 7, wherein an adhesive tape is glued to at least one of the two insulating glass units in order to delimit the abutment region.

11. The method according to claim 7, wherein a molding which defines a joint area closed to the outside is used to delimit the abutment region.

12. The facade element according to claim 2, wherein the at least one first transparent surface element is a first glass pane and the at least one second transparent surface element is a second glass pane.

13. The facade element according to claim 1, wherein the two-component silicone material, when introduced, has a viscosity of between 1.0 Pa-s and 3.5 Pa-s at 21° C. and a flow rate of approximately 10 ml/s to approximately 40 ml/s.

14. The method according to claim 7, wherein during the method step of introducing the silicone material, the silicone material has a viscosity of between 1.0 Pa-s and 3.5 Pa-s, measured in each case at room temperature.

* * * * *